(12) United States Patent
Gates et al.

(10) Patent No.: US 7,537,256 B2
(45) Date of Patent: May 26, 2009

(54) COMPONENT MODULE APPLIQUE FOR VEHICLE LIFT GATE

(75) Inventors: Terence M. Gates, Birmingham, MI (US); Philippe Gougeon, Bloomfield Hills, MI (US); Leonida S. Vaitus, Windsor (CA); William Ethan A. McClure, Clawson, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 666 days.

(21) Appl. No.: 10/865,627

(22) Filed: Jun. 10, 2004

(65) Prior Publication Data

US 2005/0194805 A1 Sep. 8, 2005

Related U.S. Application Data

(60) Provisional application No. 60/549,207, filed on Mar. 2, 2004.

(51) Int. Cl.
*B62D 25/12* (2006.01)

(52) U.S. Cl. .............. 296/1.07; 296/56; 296/146.8

(58) Field of Classification Search ............. 296/106, 296/146.8, 52, 96.15–96.17, 51, 56, 1.07; 49/502; 180/169
See application file for complete search history.

(56) References Cited

U.S. PATENT DOCUMENTS

| | | | |
|---|---|---|---|
| 4,378,484 A | 3/1983 | Kunert | |
| 4,722,206 A | 2/1988 | Nakamura et al. | |
| 5,035,449 A | 7/1991 | Shiratori et al. | |
| 5,203,602 A | 4/1993 | Eustache | |
| 5,271,120 A | 12/1993 | Eustache et al. | |
| 5,561,882 A | 10/1996 | Eustache et al. | |
| 5,605,071 A | 2/1997 | Buchanan, Jr. | |
| 5,621,942 A | 4/1997 | Eustache et al. | |
| 5,797,159 A | 8/1998 | Berge et al. | |
| 5,946,763 A | 9/1999 | Egner-Walter et al. | |
| 6,019,292 A | 2/2000 | Walther | |
| 6,019,418 A | 2/2000 | Emerling et al. | |
| 6,020,611 A | 2/2000 | Ma et al. | |
| 6,027,075 A | 2/2000 | Petrenko | |
| 6,030,105 A * | 2/2000 | Thau et al. ............. 362/488 |
| 6,123,384 A | 9/2000 | Eustache et al. | |
| 6,131,989 A | 10/2000 | Montone et al. | |

(Continued)

FOREIGN PATENT DOCUMENTS

EP 0 111 457 6/1984

(Continued)

*Primary Examiner*—Glenn Dayoan
*Assistant Examiner*—Gregory Blankenship
(74) *Attorney, Agent, or Firm*—Young Basile Hanlon MacFarlane & Helmholdt, P.C.

(57) ABSTRACT

A module in the form of a carrier with an optional decorative body is mountable on an exterior surface of a vehicle lift gate and provides a mounting platform for a plurality of components. The components include at least two of light sources in the form of LEDs or incandescent bulbs, an actuatable switch, a camera, a key lock cylinder and a movable handle. The carrier is affixed to the body and is alignable with apertures in the body for transmission of light from the light sources exteriorly of the body as well as to provide a field of view for the camera. The electric switch is actuatable through a resilient membrane.

29 Claims, 11 Drawing Sheets

U.S. PATENT DOCUMENTS

| | | | |
|---|---|---|---|
| 6,174,016 B1 * | 1/2001 | Ponziani | 296/56 |
| 6,216,309 B1 | 4/2001 | Goto et al. | |
| 6,223,385 B1 | 5/2001 | Berge et al. | |
| 6,234,564 B1 | 5/2001 | Kim | |
| 6,237,185 B1 | 5/2001 | Goto et al. | |
| 6,240,593 B1 | 6/2001 | Murata | |
| 6,298,519 B1 | 10/2001 | Berge et al. | |
| 6,416,106 B2 | 7/2002 | Ponziani | |
| 6,435,596 B1 | 8/2002 | Pyo | |
| 6,458,002 B1 | 10/2002 | Buchanan, Jr. | |
| 6,493,900 B1 | 12/2002 | Koumo et al. | |
| 6,523,882 B2 | 2/2003 | Ishikawa et al. | |
| 6,557,205 B2 | 5/2003 | Ishikawa | |
| 6,637,801 B1 | 10/2003 | Eustache et al. | |
| 6,719,362 B1 | 4/2004 | Johnson et al. | |
| 6,746,072 B1 | 6/2004 | Romesburg et al. | |
| 6,834,906 B2 * | 12/2004 | Vaitus et al. | 296/106 |
| 2001/0001336 A1 | 5/2001 | Kobayashi et al. | |
| 2001/0011831 A1 | 8/2001 | Ohashi et al. | |
| 2003/0002165 A1 * | 1/2003 | Mathias et al. | 359/630 |
| 2003/0146645 A1 | 8/2003 | Cathaya et al. | |
| 2004/0041438 A1 | 3/2004 | Simon et al. | |
| 2004/0084935 A1 | 5/2004 | Johnson et al. | |
| 2004/0124659 A1 | 7/2004 | Vaitus et al. | |
| 2004/0124664 A1 | 7/2004 | McClure et al. | |
| 2004/0130177 A1 | 7/2004 | Cathala | |
| 2004/0150250 A1 | 8/2004 | Gougeon et al. | |
| 2004/0155391 A1 | 8/2004 | Izabel | |

FOREIGN PATENT DOCUMENTS

| | | |
|---|---|---|
| EP | 0 354 646 | 2/1990 |
| EP | 0 489 630 | 6/1992 |
| EP | 0 574 309 | 12/1993 |
| EP | 0 694 453 | 1/1996 |
| EP | 0 916 559 | 5/1999 |
| EP | 1 074 442 | 2/2001 |
| EP | 1 083 101 | 3/2001 |
| EP | 1 167 137 | 1/2002 |
| EP | 1 348 614 | 10/2003 |
| FR | 2 801 017 | 5/2001 |
| FR | 2 822 792 | 10/2002 |
| FR | 2 827 565 | 1/2003 |
| FR | 2 841 488 | 1/2004 |
| FR | 2 842 154 | 1/2004 |
| GB | 1 580 926 | 12/1980 |
| GB | 2 327 598 | 2/1999 |
| GB | 2 347 340 | 9/2000 |
| JP | 11 301 420 | 11/1999 |
| JP | 2000062575 | 2/2000 |
| JP | 2000326830 | 11/2000 |
| WO | WO 01/08945 | 2/2001 |
| WO | WO 03/002363 | 1/2003 |
| WO | WO 2004/026647 | 4/2004 |
| WO | WO 2004/037622 | 5/2004 |

* cited by examiner

COMPONENT MODULE APPLIQUE FOR VEHICLE LIFT GATE

CROSS-REFERENCE TO RELATED APPLICATIONS

This application claims the benefit of the priority filing date of U.S. Provisional Patent Application Ser. No. 60/549,207, filed Mar. 2, 2004 and entitled "E-Module VI", the contents of which are incorporated herein in its entirety.

BACKGROUND

The present invention relates, in general, to motor vehicle lift gates or rear hatches and more specifically, to accessory components mounted on such vehicle lift gate or rear hatches.

In modern vehicles, larger vehicles such as SUVs, vans and station wagons have a lift gate or rear hatch which closes a rear opening in the vehicle body. The lift gate is pivotally attached, usually by hinges, to the vehicle body structure surrounding the rear opening. The lift gate is releasably latchable to the vehicle structure by a latch mechanism so as to-be movable between a closed position latched to the vehicle body structure and a pivoted, open position allowing access to the interior of the vehicle through the rear opening.

The lift gate itself is formed of a panel structure, which is stamped or otherwise formed into a panel having an upper opening for receiving a glass window. An interior trim panel is attachable to the lift gate panel to cover components mounted on the gate.

The lift gate forms a platform for a number of different accessories or components, such as a flipglass latch, a wiper motor and associated wiper arm, license plate lights, and a wash pump and/or wash nozzle. Various lights as well as the center high mounted stop light may also be mounted on the lift gate along with the lift gate latch mechanism. Other components which are usually mounted on the lift gate can include electrical contact connections to the defrost grid mounted on the lift gate glass or fiberglass.

All of these accessories or components are manufactured separately from the lift gate panel structure and are mounted, usually one at a time, on the lift gate while the vehicle is being assembled. The mounting of each component on the lift gate panel either directly or through brackets typically requires mechanical fasteners and usually, an electrical connection via a plug-in connector, screw terminal, etc. All of the mounting procedures and the mechanical and electrical connections require time, multiple workers and an increased length on the vehicle assembly line. In addition, although each component can be tested at its manufacturing site, the numerous multiple mechanical and electrical connections all create additional sources of defects which may require additional checking after assembly on the lift gate.

As can be seen, all of these factors lead to a substantial assembly time for the lift gate thereby resulting in a higher than desirable cost. To address these problems, a modular approach has been proposed in which several components are separably manufactured, pretested, and assembled into a single module, with only the module having to be mounted in a single operation on a lift gate. The number of separate mechanical fasteners and electrical connections can also be reduced by this modular approach.

So-called "appliques" are mounted above the license plate mounting area on a lift gate and serve as a mounting platform for various lift gate mounted components, such as a lift gate latch release handle, license plate lamps, lift gate lock key cylinder, etc. The assignee of the present invention has previously devised lift gate appliques which have the individual components mounted directly to a decorative applique body or housing.

While the mounting of individual components separably to the applique requires a certain amount of time and labor, the overall assembly of the lift gate in terms of individual steps and time is simplified since the applique is mounted as a complete unit on the lift gate as a sub-assembly, with wires or a wiring harness extending from the electrically operated components on the applique passing through an opening in the lift gate for connection to interior vehicle wiring.

However, it is believed that further improvements can be made with respect to reducing assembly time of the applique and the components mounted thereon. In addition, it is believed that further improvements could be made in separating the mounting of the components from direct attachment to the applique to enable the components and/or the applique to be separately replaced if damaged. In addition, it would be desirable to provide a lift gate applique which can have a standard shape or design body, which can receive different component configurations without modification to the applique body itself

SUMMARY

The present invention is an accessory component module for a vehicle lift gate which unitarily carries a plurality of components which can be mounted on a vehicle lift gate in a single assembly operation when the module itself is mounted on the lift gate.

The present invention is a component module which is mountable on the exterior surface of a vehicle lift gate. The module includes a plurality of individual components and a carrier, carrying at least two of the components. The carrier is mountable on the vehicle lift gate exterior surface.

In another aspect, an exterior decorative body is provided. The carrier is fixably mounted to the body. The body and/or the carrier are mounted to the vehicle lift gate.

The component module of the present invention provides significant advantages over previous lift gate accessory or component mounting methods by incorporating a plurality of lift gate components into a unitary module which can be attached to the lift gate in a single assembly operation. This improves the reliability of the components since the components can be preassembled, pretested and even pre-wired either before or after mounting on the module. The number of workers required to mount all of the components on the lift gate in the vehicle assembly line is reduced along with line length and assembly time. This reduces the overall costs of the lift gate components for more economical and efficient manufacturing operation. In addition, the number of electrical connectors and mechanical connection points are reduced for the lift gate to again reduce assembly time, cost and to improve reliability.

In addition, the component module of the present invention has all of the lift gate accessory components mounted on a carrier, with the carrier separately, sealingly mounted on the applique. This enables the components and the carrier to be pre-assembled and tested prior to mounting on the applique. In addition, the carrier can have a standard design and yet be assembled to appliques of different sizes and shapes, which create exterior style differentiation.

BRIEF DESCRIPTION OF THE DRAWING

The various features, advantages and other uses of the present invention will become more apparent by referring to the following detailed description and drawing in which.

DETAILED DESCRIPTION

Figure 1:
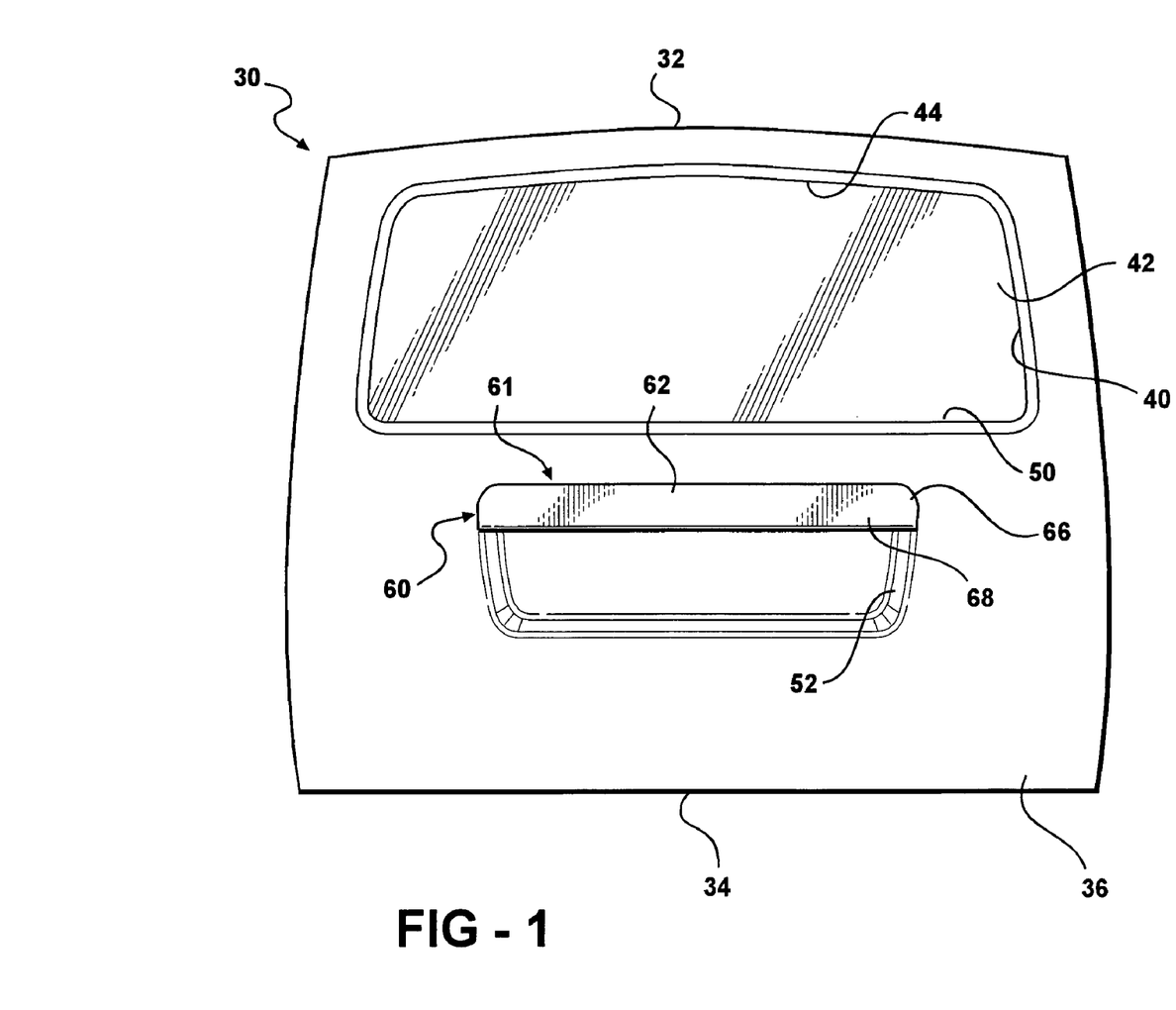
FIG. 1 is a front view of an exemplary vehicle lift gate utilizing an applique generally according to the present invention.

Referring now to the drawings, and to FIG. 1 in general, there is depicted a pictorial representation of a motor vehicle lift gate or rear hatch 30. The shape of the lift gate 30 will vary from vehicle to vehicle.

The lift gate 30 is intended, by example only, to be articulated or pivoted about an upper, generally horizontally extending, edge 32 by means of hinges attached to the surrounding vehicle body structure, not shown. When the lift gate 30 is pivotally mounted about the upper edge 32, the latch means will normally be associated with an opposed bottom edge 34. The lift gate 30 may also be articulated to the vehicle body about a vertical axis on one of the lateral side edges, with the opposite lateral edge carrying a locking means for securing the lift gate 30 in a fixed position closing the rear opening in the vehicle.

The lift gate 30 may be formed using any conventional manufacturing process, such as an outer panel 36 which is joined to an inner panel, not shown.

An aperture or opening 40 is formed in the lift gate 30. The aperture 40 is closed by a transparent panel 42, such as a glass window. The window 42 may be fixedly attached to the rear lift gate panel 36 or, articulated itself about an upper generally horizontally extending, edge 44 to the upper edge portion of the lift gate 30 by means of one or more hinges, not shown, for pivotal movement of the opposed bottom end 50 between a closed position, sealed to the lift gate 30 and an open, pivotal position spaced from the adjacent portions of the outer lift gate panel 36. Such an articulated glass or window 42 is commonly referred to as a flipglass.

As shown in FIG. 1, a recess 52 can be formed in the lift gate outer panel 36 to provide a convenient mounting location for a vehicle license plate, not shown. According to the present invention, an applique 60 is mounted on the exterior surface of the lift gate outer panel 36 immediately above the recess 52 and below the bottom horizontally extending edge 50 of the lift gate window 42. The applique 60 serves as a decorative outer surface consistent with the vehicle on which the lift gate 30 is mounted. The applique 60 includes a body 61 which is typically formed of a one piece body of molded plastic material, and can be color molded, chrome plated or painted to match the body and lift gate color of the vehicle. The body 61 is formed of suitable plastic material, such as PC, ABS, PBT or compounds thereof.

Figure 2:
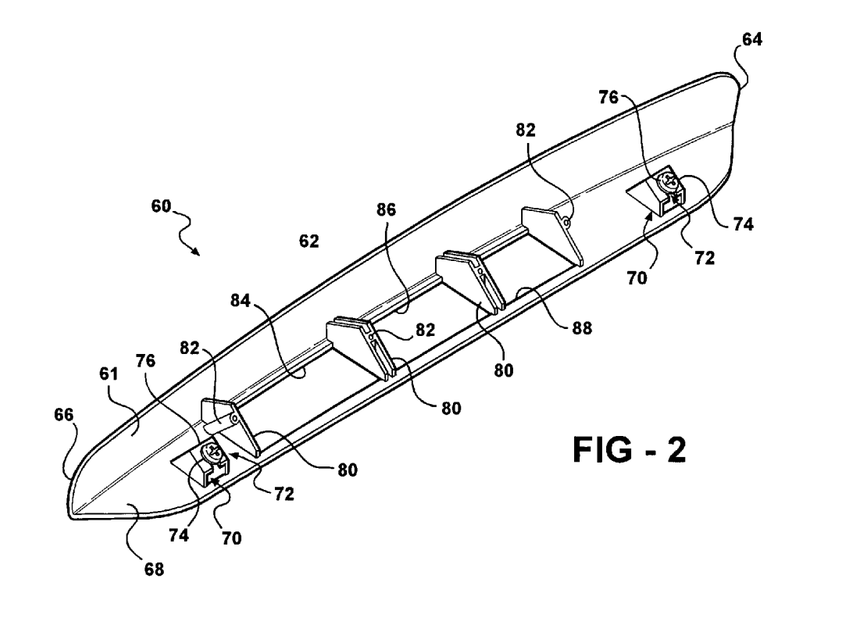
FIG. 2 is rear perspective view of the applique body shown in FIG. 1.

The body 61, shown in FIGS. 1 and 2, will have a shape consistent with the mounting location of the body 61 on the lift gate 30.

By example only, the body 61 can have a generally planar center portion 62 which transitions into two opposed angled ends 64 and 66. The opposite edge of the center portion 62 likewise transitions into a depending flange 68 which extends substantially over the entire length of the body 61 between opposed first and second ends 64 and 66.

As seen in FIG. 2, a plurality of spaced bosses 70 are integrally formed on the flange 68 and extend away from the flange 68 toward the lift gate 30 when the body 61 is mounted on the lift gate 30. The bosses 70 have a generally inverted U-shape with a center leg formed with an open-ended notch spaced from an opposite open end. The notch receives a clip 72 having oppositely extending shanks 74, which extend oppositely from spaced centrally located washers 76 which slide into and engage opposite sides of the central leg of each boss 70 to hold the clip 72 on the boss 70. One shank 74 of each clip 72 extends through the opening in the flange 68 to aid in securing the body 61 on the lift gate outer panel 36.

A plurality of rib or rib pairs 80 are formed on and extend away from the flange 68 as shown in FIG. 2. In between the rib pairs 80 or adjacent to a single rib 80, a boss 82 is provided which may be threaded for receiving a threaded shank on a fastener mounted on a carrier as described hereafter. A plurality of apertures 84, 86 and 88, by way of example only, are formed in the flange 68 of the body 61 for exposing various components on a carrier, described hereafter, to external view or access. Further, the apertures 84, 86 and 88 may be of identical or different sizes depending upon the component mounted therethrough. For example only, the aperture 84 has a longer length than the apertures 86 and 88.

Figure 3:
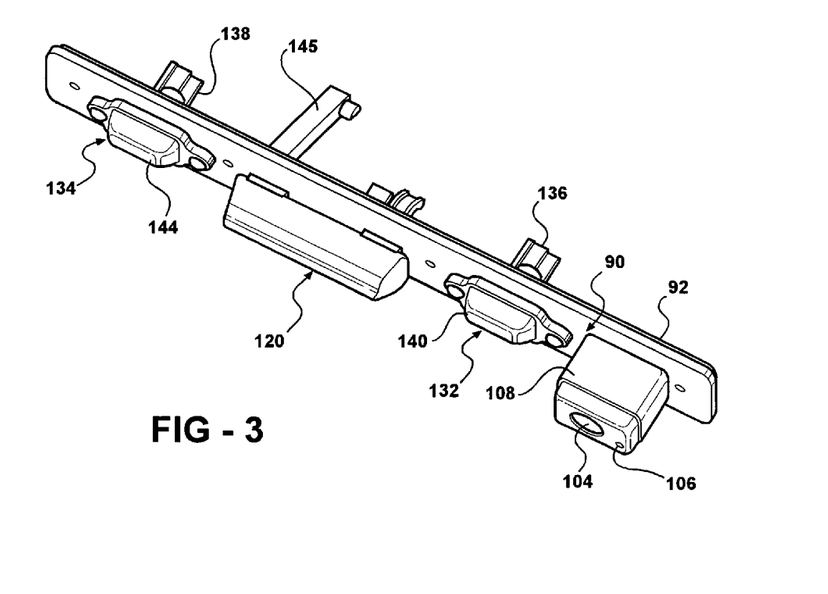
FIG. 3 is a front perspective view of one aspect of a carrier forming part of the applique shown in FIG. 1.
Figure 4:
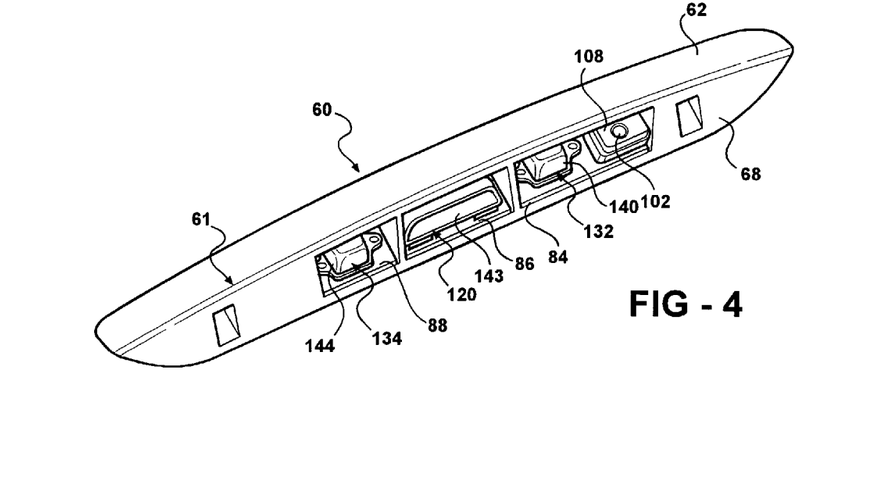
FIG. 4 is a front perspective view of the applique body and carrier.
Figure 5:
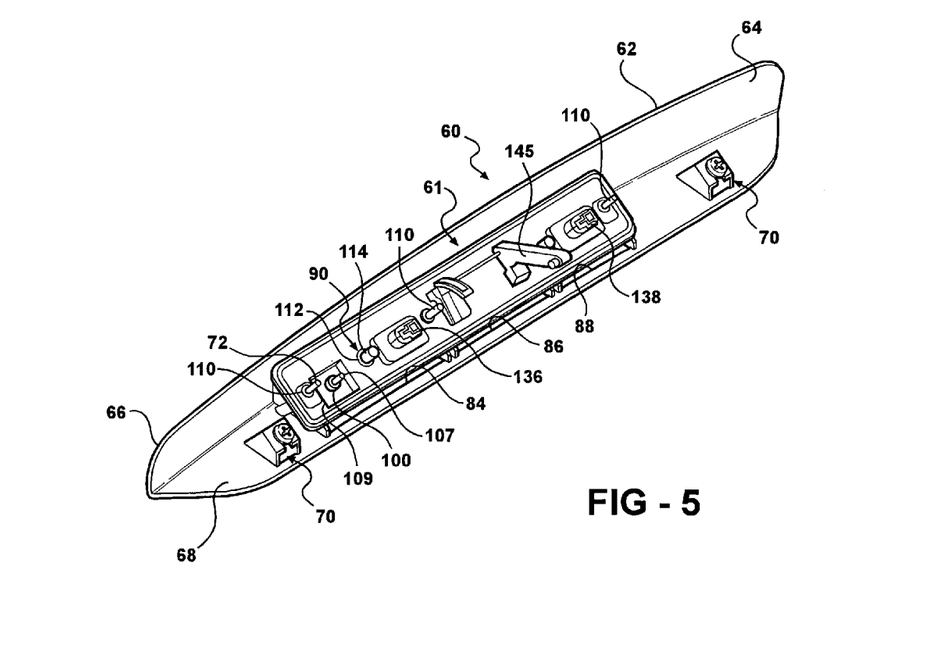
FIG. 5 is a rear perspective view of the carrier and the applique body of FIGS. 1-4.

As shown in FIGS. 3-5, one example of a component carrier 90 is depicted. The carrier 90 is formed of a substantially rigid material, such as a rigid plastic to form a base or substrate for mounting various components thereon. The carrier 90 itself is separately attachable to the applique 60 thereby mounting all of the components on the carrier 90 to the applique 60 in a single assembly operation.

It will be understood that the following description of several aspects of a carrier according to the present invention which describe various components which can be mounted on a carrier attachable to the body 61 will be understood to be exemplary only. The type and number of components, as well as the location of the component on the carrier can vary depending upon a particular vehicle design, aesthetic considerations, etc.

A peripheral edge seal 92 formed of a resilient sealing material extends along the peripheral edge of the carrier 90 for sealing the carrier 90 to the lift gate outer panel 36 when the carrier 90 is mounted on the lift gate panel 36.

One component integrated on the carrier 90 is the camera or vision unit 106 which may be any suitable camera, such as a CCD camera or CMOS, which is capable of taking pictures in black and white or color of a field of vision provided by a camera lens 102. An aperture 104 is formed on one surface 106 of a boss 108 on the carrier 90 for providing an opening through which the lens 102 is visible. Alternately, a transparent lens cover may be mounted in the aperture 104, either permanently or by removable fasteners.

Cleaning of the lens 102 may be implemented in various ways. For example, a hydrophobic or hydrophilic coating can be applied to the exterior surface of the lens 102 to repel debris. A thin defrost grid could also be mounted in or over the lens 102 to provide heating to remove frost, ice or snow from the lens 102 without interfering with operation of the camera 100.

Camera power and video output cables 107 extend from the camera 100, as shown in FIG. 5, for routing to a suitable camera output display device which is typically mounted in the interior in the passenger compartment of the vehicle.

The camera 100, as shown in FIG. 5, is fixed to the boss 108 on the carrier 90 by means of a mounting strap 109 which is secured by stud 110 and 112 to the carrier 90. A central portion of the strap 109 serves as a base for the camera 100 disposed within the boss 108 on the carrier 90. One end flange of the strap 109 is mountable below the shank of one of the studs 110 used to attach to carrier 90 to the flange 68 of the body 61. The other fastener 112 extends through an opposite end of the strap 109 and threadingly engages a boss 114 formed in the carrier 90.

As shown in FIG. 4, the boss 108 and camera lens 102 project through the aperture 84 in the flange 68 of the body 61.

In the aspect of the applique 60 shown in FIGS. 4 and 5, the apertures 84 and 88 cooperate with light sources, described hereafter, to provide illumination for a vehicle license plate mounted in the recess 52 on the lift gate 30. The aperture 84 may also receive a light source to provide additional illumination for the camera 100.

The individual light sources 132 and 134, with two shown, by way of example only, are mounted on the carrier 90 as shown in FIGS. 3-5. Although the light sources 132 and 134 may comprise any suitable light source, such as an incandescent bulb or one or a cluster of LEDs, one bulb is shown as a pictorial example of each light source. Each bulb is mounted in a socket 136 or 138 which is snap connected to the carrier 90. Leads extend from the sockets 136 and 138 to provide electric current when the light sources 132 and 134 are to be activated.

A lens cover 140 and 144 is mounted by fasteners to the carrier 90 to sealingly cover the light source or bulbs 132 and 134.

As shown in FIG. 4, the light source 134 extends into the aperture 88. The light source 132 is located in the aperture 84.

The aperture 86 cooperates with an actuator, handle, or a switch mountable within the carrier 90, as described hereafter, to provide actuation for use in operating a component mounted on the lift gate, such as a latch used to releasably latch the liftgate 30 in a closed, sealed position.

In the case of an electronic actuator, described hereafter, in another aspect of the invention, the actuator is in the form of a resilient membrane mounted on the bottom edge of a chamber in a sealed manner. The center portion of the membrane is movable against a plunger of the switch through an actuator spring to provide an output signal from the switch via switchable contacts in the switch housing.

In the aspect of the invention shown in FIGS. 3-6, the actuator 120 is a mechanical actuator in which a lever 143 is pivotally accessible exteriorly of the body 61 through the aperture 86. The lever 143 pivots an arm 145, shown in FIGS. 3, 5 and 6. The arm 145 is connected via a link to a pivotal arm on a lift gate latch, all not shown, for releasing the claw of the latch to enable the lift gate 30 to be pivoted to an outward position.

During assembly, the individual light sources 132 and 134 are mounted on the carrier 90 along with the switch 120 and the camera 100. The entire carrier 90 is then secured to the body 61 using the studs 110.

The body 61 is then mounted to the lift gate 30 in a single assembly operation, typically by a single worker. The threaded studs 110 are inserted through the appropriate apertures in the lift gate outer panel 36 and receive a tightenable nut to fixedly, yet releasably secure the body 61 to the lift gate 30. The individual electrical connections to the camera 100, the sockets 136 and 138 of the light sources 132 and 134, and the actuator 120, in the case of a mechanical actuator, can then be attached by screw terminals, soldering, plug together connectors, etc.

Figure 6:
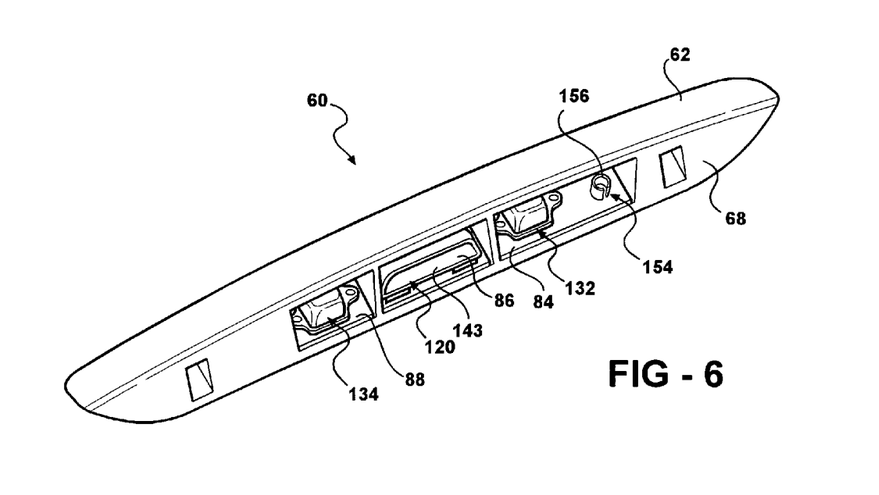
FIG. 6 is a front perspective view of the carrier and an applique body in another aspect of the present invention.
Figure 7:
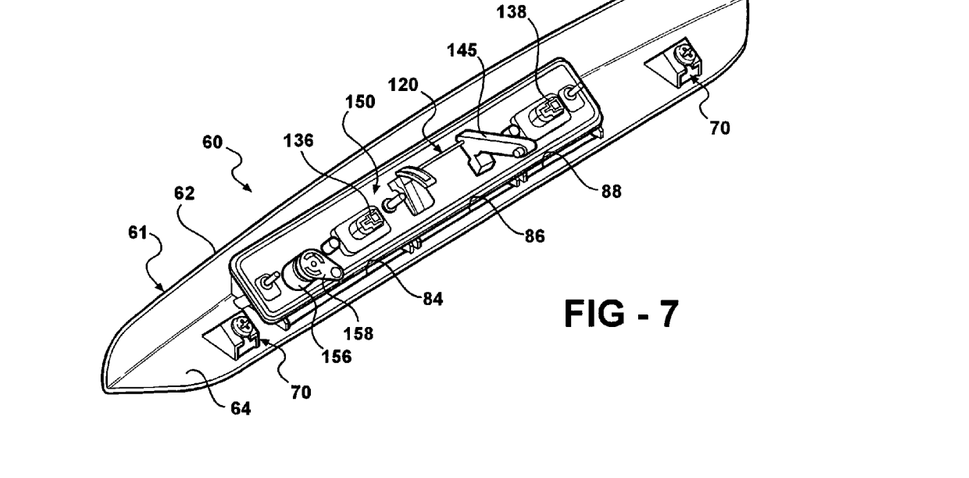
FIG. 7 is a rear perspective view of the applique body and carrier shown in FIG. 6.

Referring now to FIGS. 6 and 7, there is depicted another aspect of a carrier 150 according to the present invention. The carrier 150 is substantially identical in shape and component mounts as the carrier 90 described above. Specifically, the carrier 150 carries an actuator handle 120, such as a mechanical actuator with the arm 145, light sources having sockets 136 and 138 projecting outward from one side of the carrier 150, and suitable mounts for attaching the carrier 150 to the body 61 as well as to the lift gate outer panel 36.

In this aspect of the present invention, the carrier 150 includes a key lock cylinder 154. The key lock cylinder 154 is mounted in a cylindrical boss 156 projecting outwardly from both surfaces of the carrier 150. The lock cylinder 154 is mounted within the boss 156. A rotatable arm 158 is mounted on the boss 156 and fits with the inner end of the lock cylinder 154 and is connected by a link or arm, not shown, to the lift gate latch mechanism for locking and unlocking the lift gate latch mechanism.

Figure 8:
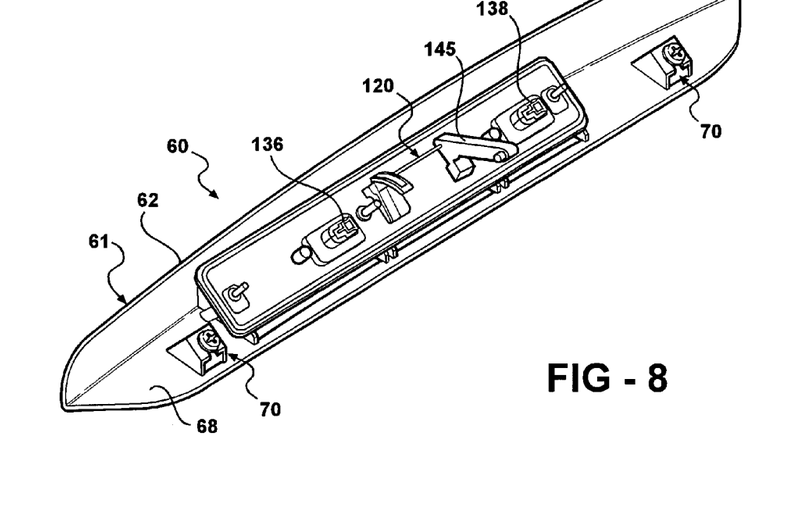
FIG. 8 is a rear perspective view of another aspect of an applique body and carrier according to the present invention.
Figure 9:
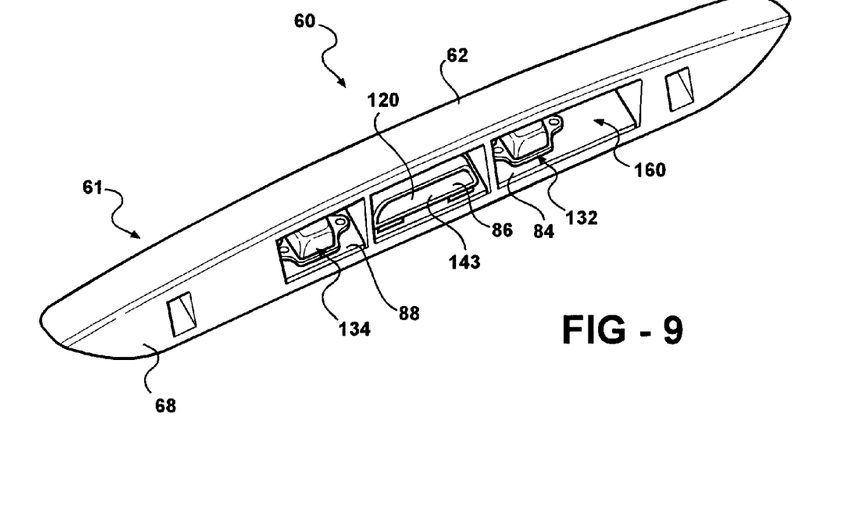
FIG. 9 is a front perspective view of the applique body and carrier shown in FIG. 8.

As shown in FIGS. 8 and 9, a carrier 160, which is substantially the same as carrier 150 described above, is mounted on the body 61 and carries light source sockets 136 and 138 and a handle actuator 120. In this aspect, however, the carrier 160 is blank or solid at the location of the camera 100 or the key lock cylinder 154 described above on the carriers 90 and 150.

Figure 10:
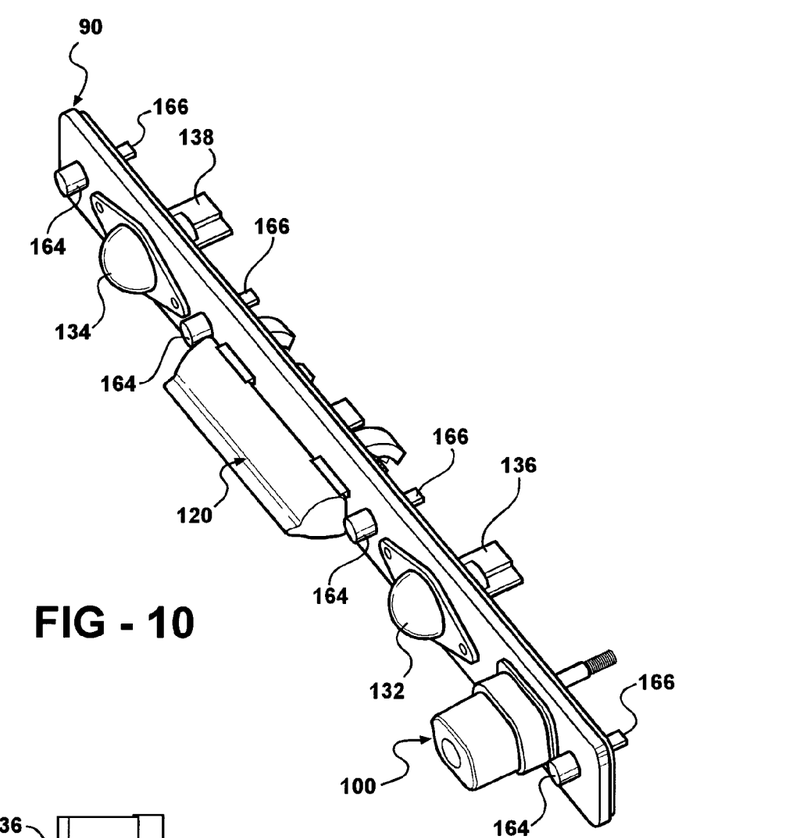
FIG. 10 is a front perspective view of another aspect of a carrier.
Figure 11:
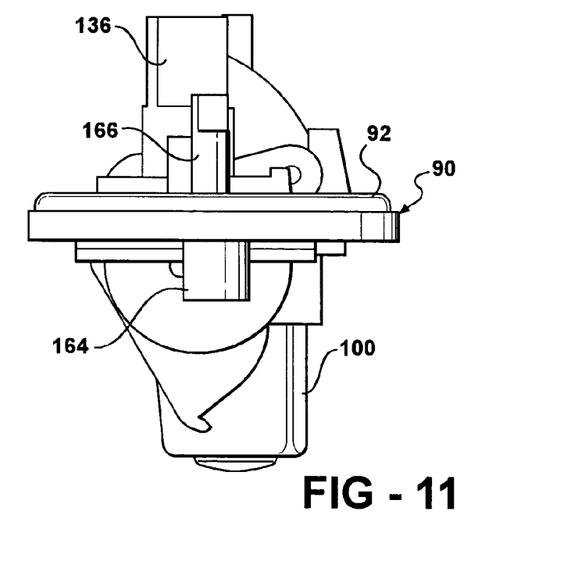
FIG. 11 is a left end view of the carrier shown in FIG. 10.

Any of the carriers 90, 150 and 160 can also function as the applique themselves without an exterior decorative body 61. In this construction, the carrier 90, shown in FIGS. 10 and 11, mounts exteriorly on the lift gate outer panel 36. The carrier 90 carries light sources 132 and 134, the handle actuator 120 and a camera 100 as described above. A plurality of closed end bosses 164 project from an outer surface of the carrier 90. The interior of each boss 164 is threaded for receiving a threaded fastener 166. The other end of each threaded shank 166 passes through an aperture in the lift gate outer panel 36 and receives a tightenable nut to secure the entire carrier 90 to the lift gate outer panel 36. The peripheral seal 92 on the carrier 90 seals the carrier 90 to the lift gate outer panel 36.

Figure 12:
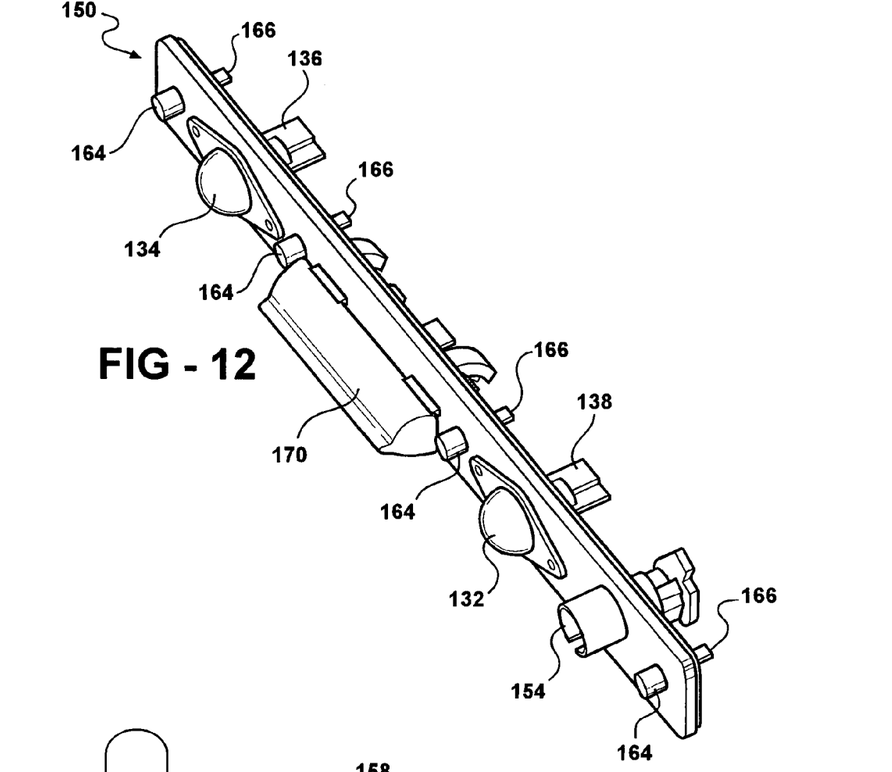
FIG. 12 is a front perspective view of another aspect of a carrier according to the present invention.
Figure 13:
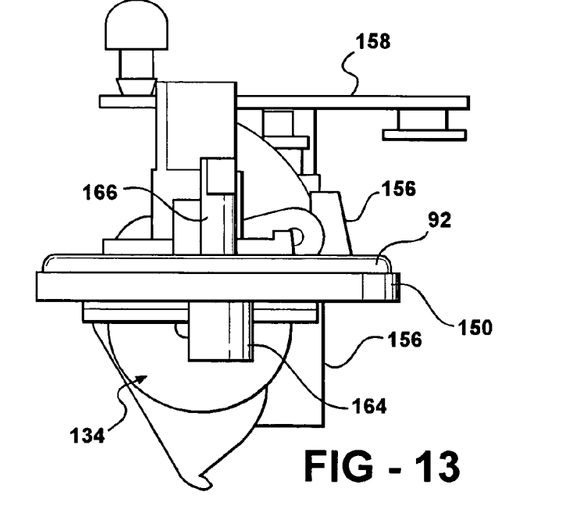
FIG. 13 is a left end view of the carrier shown in FIG. 12.

In FIGS. 12 and 13, the carrier 150 described above and shown in FIGS. 6 and 7 likewise is designed for exterior mounting separate from a body 61. The plurality of bosses 164 are formed on the carrier 150 and receive the threaded shanks 166 as described above and shown in FIGS. 10 and 11.

Figures 14, 15:
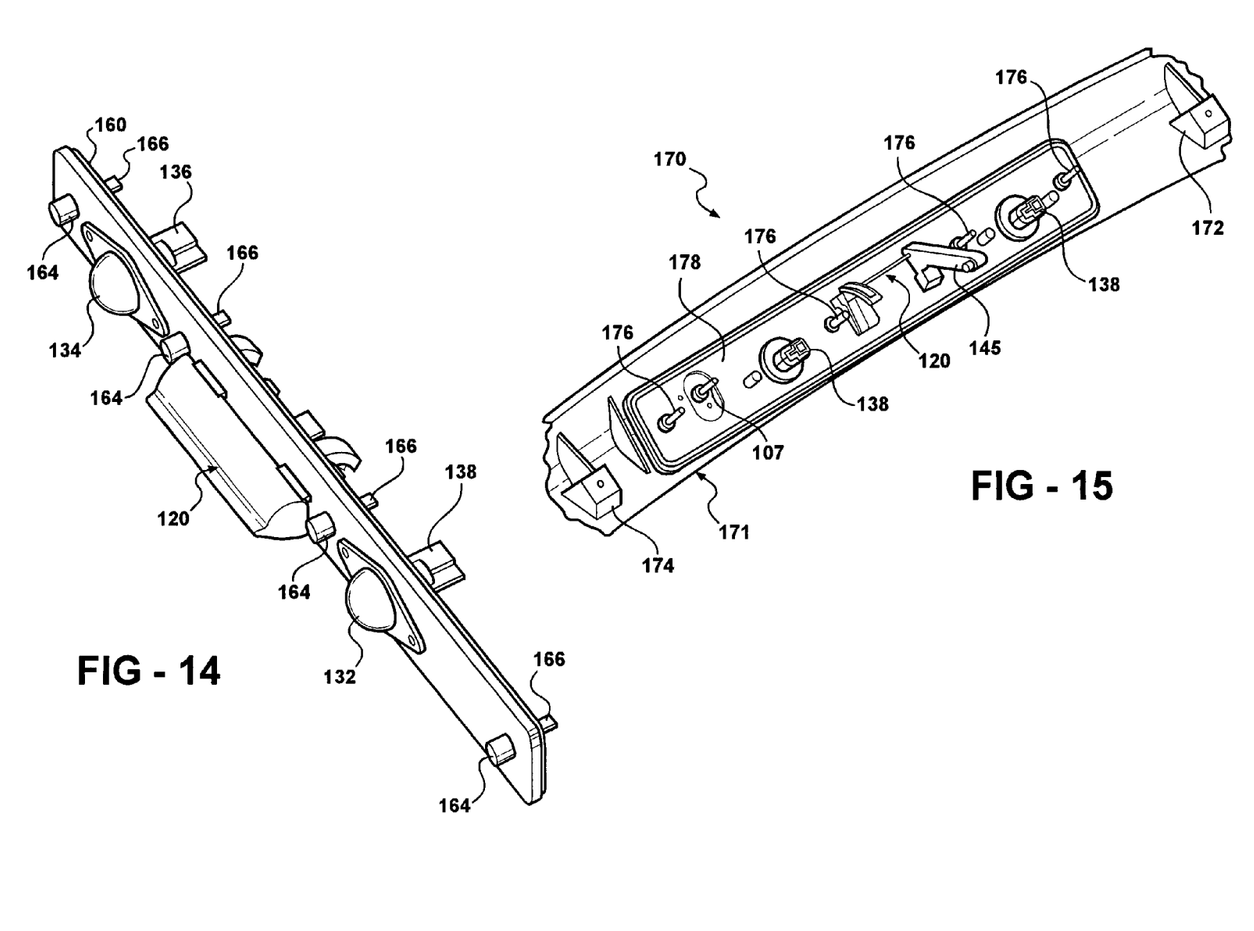
FIG. 14 is a front perspective view of another aspect of a carrier according to the present invention.
FIG. 15 is a rear perspective view showing a carrier, similar to the carrier depicted in FIG. 12, but mounted on an applique body.

FIG. 14 depicts the carrier 160, which also carries the bosses 164 for exterior mounting on the lift gate outer panel 36 as an applique itself without an outer decorative body 61.

FIG. 15 depicts another aspect of the present invention in which an applique 170, has a body 171 with substantially the same exterior shape as the body 61. The body 171 is formed with a pair of mounting bosses 172 and 174 which receive threaded fasteners extending through apertures in the lift gate outer panel 36. Although not shown in FIG. 15, J-clips are mounted in other bosses spaced along the length of the body 171 and receive the threaded studs 176 to mount a carrier 178 on the body 171. The carrier 178 is substantially the same as the carrier 60 in that it carries light sources with sockets 136 and 138, a linkage arm 145 for a handle actuator 120 and output leads 107 from a camera, not shown. The camera is mounted directly to the carrier 90 without the mounting strap 108 described above and shown in FIG. 5.

Figure 16:
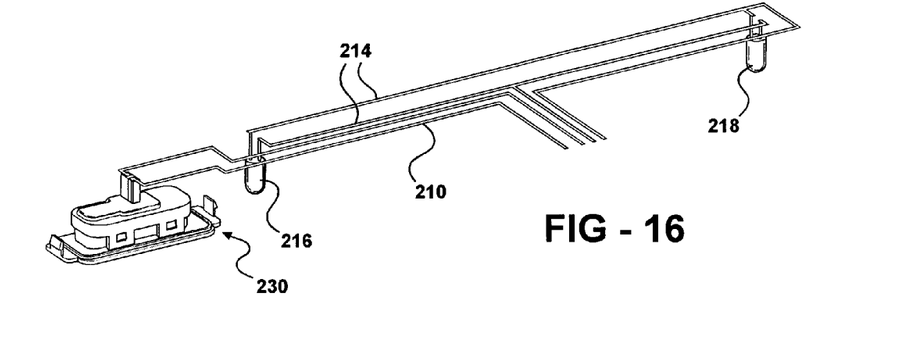
FIG. 16 is a perspective view of a lead frame mountable on a carrier according to another aspect of the present invention.
Figure 17:
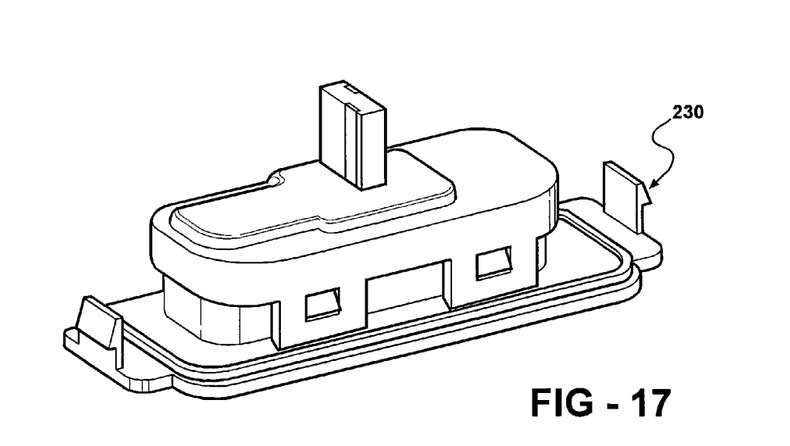
FIG. 17 is an enlarged, perspective view of an electrical handle switch which is mounted on the lead frame shown in FIG. 16.
Figures 18, 19:
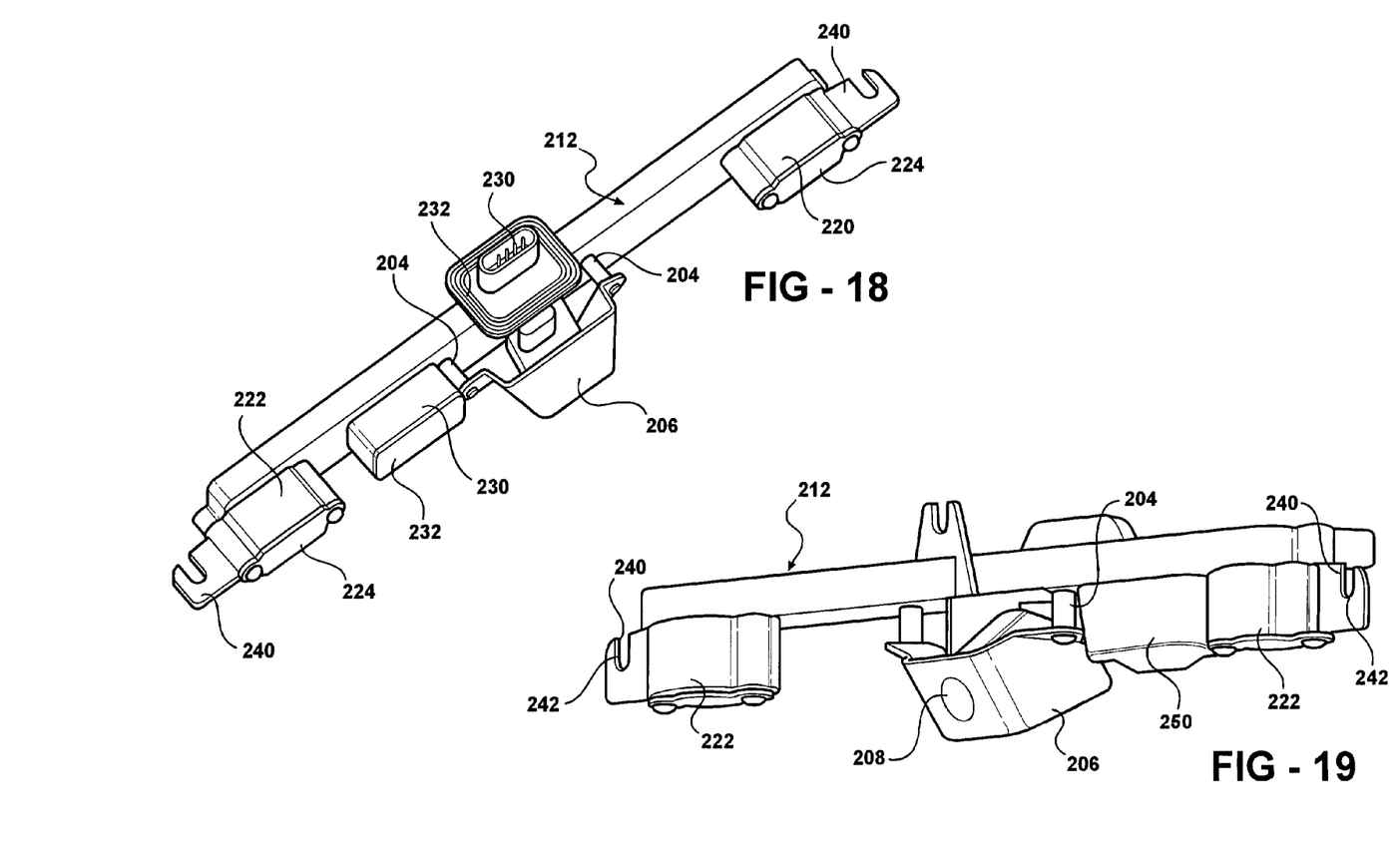
FIG. 18 is a rear perspective view of another aspect of a carrier according to the present invention.
FIG. 19 is a rear perspective view of the carrier shown in FIG. 18.
Figure 20:
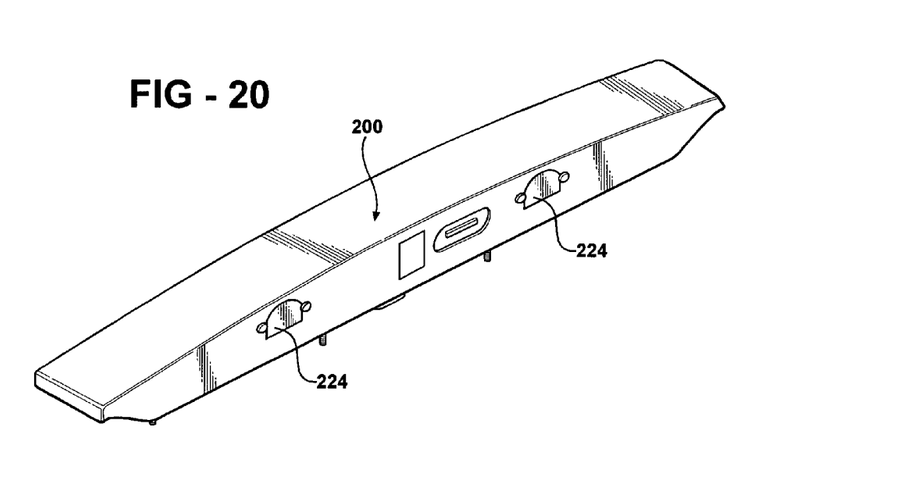
FIG. 20 is a front perspective view of an applique body incorporating the carrier shown in FIGS. 18 and 19.
Figure 21:
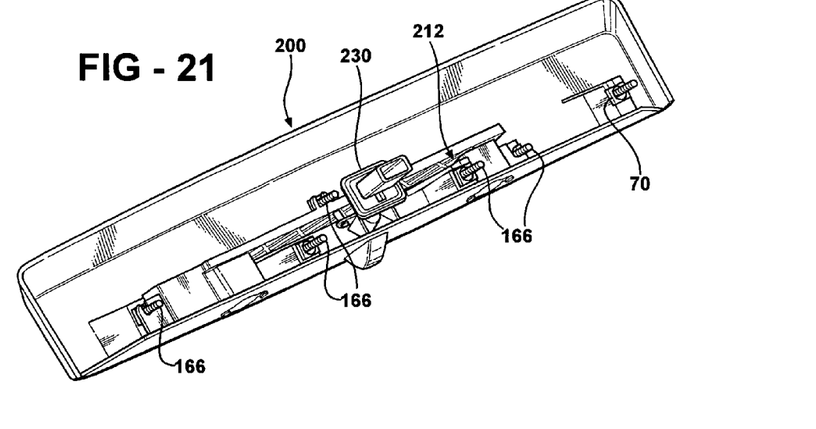
FIG. 21 is a rear perspective view of the applique body and the carrier shown in FIGS. 18-20.

In FIG. 16, the versatility of the lead frame 210 is demonstrated by the location of the handle switch 230 at one end of leads 214. In FIGS. 18 and 19, the switch 230 and its exteriorly accessible membrane 232, is mounted between the camera and the light source 222. It will be understood that, as described above, the components including the camera, light sources and switch 230 may be mounted at any position along the length of the lead frame 210 and the carrier 212.

In this aspect, the lead frame assembly 210, as shown in FIG. 16, is overmolded in the carrier 212. In the lead frame assembly, stamped or otherwise formed electrically, conductive leads 214 are mounted in the carrier 212 in a configuration to provide power or an output signal from various components electrically connected to the individual leads 214. Thus, incandescent bulbs 216 and 218 or LEDs, are secured, such as by solder, to selected leads 214. Receptacles 220 and 222 are disposed about each bulb 216 and 218 and sealingly enclose each bulb 216 and 218. A transparent or opaque lens 224 is mounted on each receptacle 220 and 222.

As seen in FIGS. 17-21, a connector 230 with a peripheral edge seal 232 is also mounted on the carrier 212 and provides an output connection for the ends of the leads 214 of the lead frame 210 to a mating connector, not shown, mounted on the lift gate 30. The lens or covers 224 are mounted over the opening in one end of the receptacles 220 and 222 by adhesive or fasteners as shown in FIGS. 18 and 19.

The carrier 212 is mounted on the body 200 by means of hangers or flanges 240. Two flanges 240, one disposed at each end of the carrier 212, are used by way of example. Each flange 240 has a generally planar form and includes an open ended notch 242. The notch 242 enables the flanges 240 to be disposed over one of the threaded studs 166. Mounting of a nut over the end of the stud 166 from the inside surface of the lift gate outer panel 36 will secure the carrier 212 to the applique 200 and at the same time, secure the body 200 to the lift gate outer panel 36.

The body 200 is constructed similar to the applique 60 in terms of shape, as well as the components mounted thereon. Thus, the body 200 includes standoffs 204 for receiving a bracket 206 to support a camera operable through an opening 208, as shown in FIGS. 18 and 19.

A switch 250 is also mounted by soldered, welded, or plugs to output terminals to the leads 214 to provide an actuation signal upon movement or depression of the electronic handle or membrane described above.

In conclusion, the present invention discloses different aspects of a component carrying applique for use on a vehicle lift gate. The applique may include a decorative outer body and carrier or simply comprise a carrier on which the components are mounted. Different components as well as different mounting positions for each component can be provided on the carrier.

In the aspects in which the carrier is mounted to a decorative outer applique body, the carrier may remain the same for one or more vehicles, with only the decorative applique being changed for different components and component mounting configurations.

All of the carriers and/or appliques of the present invention share the unique advantage of mounting all of the components to the vehicle lift gate in a single operation instead of by individual component mounts as in the prior art.

What is claimed is:

1. A component module mountable on an exterior surface of a vehicle lift gate, the module comprising:
   a plurality of individual components;
   a carrier carrying at least two components, the carrier mountable on a vehicle lift gate exterior surface, the components including at least one light source, the camera, a switch, a key lock cylinder, a seal, a connector, and a movable handle;
   an exterior decorative body;
   means for fixedly mounting the carrier to the body; and
   at least one lens cover mounted on the carrier, the lens cover viewable exteriorly of the body.

2. The module of claim 1 wherein the camera comprises:
   a camera lens.

3. The module of claim 2 further comprising:
   means for modifying adhesion between the lens and foreign matter.

4. The module of claim 3 wherein the adhesion modifying means comprises:
   one of a hydrophobic and a hydrophilic film disposed over the camera lens.

5. The module of claim 2 further comprising:
   a transparent cover mounted over the lens.

6. The module of claim 1 wherein the switch comprises:
   a resilient membrane carried on the carrier and exteriorly accessible of the carrier, movement of the membrane actuating the switch.

7. The module of claim 1 wherein the switch comprises:
   an electrical switch having a movable actuator for switching contacts of the switch to generate a switch output signal when the actuator is moved.

8. The module of claim 1 wherein the body further comprises:
   apertures formed in the body alignable with a light source mounted in the carrier.

9. The module of claim 8 wherein the light source comprises:
   a light emitting diode.

10. The module of claim 8 wherein the light source comprises:
    an incandescent bulb.

11. The module of claim 1 wherein:
    the lens cover is removably mounted on the carrier.

12. The module of claim 1 further comprising:
    means for mounting the body to the vehicle lift gate.

13. The module of claim 12 wherein the body mounting means comprises:
    a plurality of bosses carried on the body; and
    fasteners mounted in the bosses and securable to the vehicle lift gate.

14. The module of claim 1 wherein the carrier mounting means comprises:

a plurality of bosses carried on the body; and fasteners mounted in the bosses and extendable through the carrier into the vehicle lift gate.

15. The module of claim 14 wherein:

the bosses are threaded; and the fasteners have at least one threaded shank.

16. The module of claim 15 wherein:

the fasteners have an opposed threaded shank; and a tightenable nut mountable over the opposed threaded shank and to secure each fastener to the vehicle lift gate.

17. The module of claim 1 further comprising:

a light source carried on the carrier;

a lead frame including a plurality of conductive leads fixedly mounted on the carrier; and at least one of the components electrically connected to the leads.

18. The module of claim 17 wherein the light source comprises: a light emitting diode.

19. The module of claim 17 wherein the light source comprises: an incandescent bulb.

20. A component module mountable on an exterior surface of a vehicle lift gate the module comprising:

a plurality of individual components;

a carrier carrying at least two components, the carrier mountable on the vehicle lift gate exterior surface;

a light source carried on the carrier;

a lead frame including a plurality of conductive leads fixedly mounted on the carrier;

at least one of the components electrically connected to the leads;

a lens cover mounted on the carrier adjacent to the light source; and the lens cover viewable exteriorly of the carrier.

21. The module of claim 20 wherein:

the lens cover is removably mounted to the carrier.

22. The module of claim 20 further comprising:

an exterior decorative body; and means for fixedly mounting the carrier to the body.

23. The module of claim 22 wherein the body further comprises:

apertures formed in the body alignable with the light source mounted in the carrier.

24. The module of claim 20 further comprising:

an electrical harness extending from the lead frame adapted for connection to circuits in the vehicle lift gate.

25. The module of claim 22 further comprising:

means for mounting the body to the vehicle lift gate.

26. The module of claim 25 wherein the body mounting means comprises:

a plurality of bosses carried on the body; and fasteners mounted in the bosses and securable to the vehicle lift gate.

27. The module of claim 22 wherein the carrier mounting means comprises:

a plurality of bosses carried on the body; and fasteners mounted in the bosses and extendable through the carrier into the vehicle lift gate.

28. The module of claim 27 wherein:

the bosses are threaded; and the fasteners have at least one threaded shank end.

29. The module of claim 28 wherein:

the fasteners have an opposed threaded shank end; and a tightenable nut mountable over the opposed threaded shank and to secure the fasteners to the vehicle lift gate.

* * * * *